United States Patent
Menand et al.

(10) Patent No.: US 10,671,261 B2
(45) Date of Patent: Jun. 2, 2020

(54) APPLICATION DEPENDENT REMOTE CONTROL

(71) Applicant: OpenTV, Inc., San Francisco, CA (US)

(72) Inventors: Jean-Rene Menand, Los Altos, CA (US); Pierre Willard, Palo Alto, CA (US)

(73) Assignee: OPENTV, INC., San Francisco, CA (US)

( * ) Notice: Subject to any disclaimer, the term of this patent is extended or adjusted under 35 U.S.C. 154(b) by 375 days.

(21) Appl. No.: 15/407,769

(22) Filed: Jan. 17, 2017

(65) Prior Publication Data
US 2018/0203589 A1    Jul. 19, 2018

(51) Int. Cl.
*G06F 3/0484* (2013.01)
*G08C 17/02* (2006.01)

(52) U.S. Cl.
CPC ......... *G06F 3/04847* (2013.01); *G08C 17/02* (2013.01); *G08C 2201/21* (2013.01); *G08C 2201/30* (2013.01); *G08C 2201/92* (2013.01)

(58) Field of Classification Search
CPC .................. G06F 3/04847; G08C 2201/92
See application file for complete search history.

(56) References Cited

U.S. PATENT DOCUMENTS

| | | | |
|---|---|---|---|
| 5,760,698 | A | 6/1998 | Iijima et al. |
| 5,883,621 | A | 3/1999 | Iwamura |
| 6,321,382 | B1 | 11/2001 | Wugofski |
| 6,603,488 | B2 | 8/2003 | Humpleman et al. |

(Continued)

FOREIGN PATENT DOCUMENTS

| | | |
|---|---|---|
| CN | 110199331 | 9/2019 |
| EP | 2383984 A2 | 11/2011 |

(Continued)

OTHER PUBLICATIONS

"International Application Serial No. PCT/US2018/013870, International Search Report dated Jun. 6, 2018", 5 pgs.

(Continued)

*Primary Examiner* — Shourjo Dasgupta
(74) *Attorney, Agent, or Firm* — Schwegman Lundberg & Woessner, P.A.

(57) ABSTRACT

Example embodiments provide a system and method for configuring remote control devices to display application dependent control frames of a remote control user interface. A digital receiver runs a plurality of applications at the receiver device. The digital receiver detects a switch command. The switch command causes a background application to become a primary application, whereby the primary application is the application in focus on a display device. The digital receiver switches the background application into the primary application, the switching causing a previous primary application to become a new background application. The digital receiver retrieves, from a settings datastore, configuration information for remote control settings corresponding to the primary application, and causes, based on the configuration information for the remote control settings, a remote control frame corresponding to the primary application to replace, on a display of the remote control device, a remote control frame corresponding to the previous primary application.

17 Claims, 10 Drawing Sheets

(56) References Cited

U.S. PATENT DOCUMENTS

| | | |
|---|---|---|
| 6,748,005 B1 | 6/2004 | Riazi et al. |
| 8,397,255 B2 | 3/2013 | Wachtfogel et al. |
| 9,313,258 B2 | 4/2016 | Stransky-Heilkron |
| 9,819,985 B2 | 11/2017 | Stransky-Heilkron |
| 2005/0028208 A1 | 2/2005 | Ellis et al. |
| 2006/0195553 A1 | 8/2006 | Nakamura |
| 2008/0159715 A1 | 7/2008 | Fuasaro et al. |
| 2008/0320539 A1 | 12/2008 | Ohkita |
| 2009/0138441 A1* | 5/2009 | Valentine ........... H04N 7/17318 |
| 2009/0161027 A1 | 6/2009 | Hardacker et al. |
| 2010/0017736 A1 | 1/2010 | Kim |
| 2010/0153885 A1 | 6/2010 | Yates |
| 2010/0208146 A1 | 8/2010 | Reams |
| 2010/0235781 A1 | 9/2010 | Friedlander et al. |
| 2010/0241699 A1 | 9/2010 | Muthukumarasamy et al. |
| 2011/0138334 A1 | 6/2011 | Jung |
| 2011/0167447 A1 | 7/2011 | Wong |
| 2011/0219420 A1 | 9/2011 | Raveendran et al. |
| 2011/0258660 A1 | 10/2011 | Thomas et al. |
| 2012/0054794 A1 | 3/2012 | Kim et al. |
| 2012/0256737 A1 | 10/2012 | Park |
| 2012/0317085 A1 | 12/2012 | Green et al. |
| 2013/0069769 A1 | 3/2013 | Pennington et al. |
| 2013/0113698 A1 | 5/2013 | Kuroume et al. |
| 2013/0152135 A1 | 6/2013 | Hong et al. |
| 2013/0312039 A1* | 11/2013 | Kuo .................... H04N 21/435 725/56 |
| 2014/0049467 A1 | 2/2014 | Laligand et al. |
| 2014/0053222 A1 | 2/2014 | Shoykher et al. |
| 2014/0143336 A1 | 5/2014 | Arunachalam et al. |
| 2014/0152901 A1 | 6/2014 | Narita et al. |
| 2014/0168523 A1 | 6/2014 | Kwak |
| 2014/0210693 A1 | 7/2014 | Bhamidipati et al. |
| 2014/0267933 A1* | 9/2014 | Young ............. H04N 21/42203 348/734 |
| 2014/0304612 A1* | 10/2014 | Collin ................. G06F 3/04842 715/748 |
| 2014/0351870 A1 | 11/2014 | Amine et al. |
| 2015/0020098 A1 | 1/2015 | Matsuda |
| 2015/0040023 A1 | 2/2015 | Stransky-heilkron |
| 2015/0113567 A1 | 4/2015 | Scheer |
| 2015/0172767 A1 | 6/2015 | Park et al. |
| 2016/0007083 A1 | 1/2016 | Gurha |
| 2016/0182938 A1 | 6/2016 | James |
| 2016/0255389 A1 | 9/2016 | Stransky-Heilkron |
| 2016/0261903 A1 | 9/2016 | Epstein et al. |
| 2017/0195735 A1 | 7/2017 | Kaliamoorthi et al. |

FOREIGN PATENT DOCUMENTS

| | | |
|---|---|---|
| EP | 2453667 A1 | 5/2012 |
| EP | 2667583 A2 | 11/2013 |
| WO | WO-2006134585 A1 | 12/2006 |
| WO | WO-2015015295 A1 | 2/2015 |

OTHER PUBLICATIONS

"International Application Serial No. PCT/US2018/013870, Written Opinion dated Jun. 6, 2018", 5 pgs.

"U.S. Appl. No. 13/958,366, Final Office Action dated Oct. 9, 2015", 24 pgs.

"U.S. Appl. No. 13/958,366, Non Final Office Action dated Mar. 6, 2015", 21 pgs.

"U.S. Appl. No. 13/958,366, Notice of Allowance dated Feb. 1, 2016", 7 pgs.

"U.S. Appl. No. 13/958,366, Response filed Jan. 12, 2016 to Final Office Action dated Oct. 9, 2015", 12 pgs.

"U.S. Appl. No. 13/958,366, Response filed Jul. 6, 2015 to Non Final Office Action dated Mar. 6, 2015", 13 pgs.

"U.S. Appl. No. 15/085,322, Final Office Action dated Nov. 21, 2016", 14 pgs.

"U.S. Appl. No. 15/085,322, Non Final Office Action dated Mar. 1, 2017", 15 pgs.

"U.S. Appl. No. 15/085,322, Non Final Office Action dated May 16, 2016", 9 pgs.

"U.S. Appl. No. 15/085,322, Response filed Aug. 11, 2016 to Non Final Office Action dated May 16, 2016", 8 pgs.

"U.S. Appl. No. 15/085,322, Response filed, Feb. 21, 2017 to Final Office Action dated Nov. 21, 2016", 9 pgs.

"International Application Serial No. PCT/IB2014/001644, International Search Report dated Jan. 12, 2015", 4 pgs.

"International Application Serial No. PCT/IB2014/001644, Written Opinion dated Jan. 12, 2015", 4 pgs.

"U.S. Appl. No. 15/085,322, Notice of Allowance dated Aug. 2, 2017", 7 pgs.

"U.S. Appl. No. 15/085,322, Response filed Jun. 30, 2017 to Non Final Office Action dated Mar. 1, 2017", 12 pgs.

U.S. Appl. No. 15/294,727, filed Oct. 15, 2016, System and Method to Manage Switching Between Devices.

"European Application Serial No. 16207105,4, Extended European Search Report dated May 9, 2017", 9 pgs.

HID WG, "HID over GATT Profile Specification", Bluetooth Doc, [Online] Retrieved from the Internet: <URL: https://www.bluetooth.com/specifications/adopted-specifications#gattspec>, (Dec. 27, 2011), 38 pgs.

"International Application Serial No. PCT US2018 013870, International Preliminary Report on Patentability dated Aug. 1, 2019", 7 pages.

* cited by examiner

```
<frame id="netshow">
<row align="top" background="black">
    <button id="home"><image src="file://netshow.jpg" align="left"/></button>
    <button id="browse"><image src="file://Browse.jpg"/></button>
    <button id="search"><image src="file://search.jpg" align="right"/></button>
</row>
<row>
<swipe id="swipe" direction="horizontal">
    <image src="file://promotion.jpg" align="left"/>
    <image src="file://planes.jpg"/>
    ...
    <image src="file://x-files.jpg"/>
</swipe>
</row>
<row align="bottom">
    <button id="play"><image src="file://play.jpg" align="left"/></button>
    <button id="favorite"><image src="file://myList.jpg"/></button>
</row>
</frame>
```

FIG. 5A

APPLICATION DEPENDENT REMOTE CONTROL

FIELD

The present disclosure generally relates to machines configured to the technical field of special-purpose machines that facilitate configuring remote controls including computerized variants of such special-purpose machines and improvements to such variants, and to the technologies by which such special-purpose machines become improved compared to other special-purpose machines that facilitate configuring remote controls. In particular, the present disclosure addresses systems and methods for configuring a remote control device to display application dependent control frames of a remote control user interface.

BACKGROUND

Currently, a single programmable remote control device (e.g., herein referred to as a "universal remote control") allows control of multiple devices. Typically, a user inputs information (e.g., brand and model number) about a device that will be controlled by the universal remote control. Given the information for the device, the universal remote control knows, from a preset database of known devices, how to communicate with the device. The devices to be controlled may comprise, for example, televisions, Blu-ray players, and sound systems.

Conventionally, the universal remote control provides a way to switch from one device to another, which allows a user to keep using the same universal remote control when using multiple devices. Some more sophisticated universal remote controls have a touch screen and allow users to create macro commands by remembering sequences of actions (e.g., turn on Blu-ray and television together) and associating a macro command to a button. However, all existing universal remote controls have specific behavior that is defined by the devices they are controlling.

BRIEF DESCRIPTION OF DRAWINGS

Various ones of the appended drawings merely illustrate example embodiments of the present invention and cannot be considered as limiting its scope.

FIG. 5A is an example of control frame description language to establish a remote control frame for an application.

DETAILED DESCRIPTION

Figure 1:
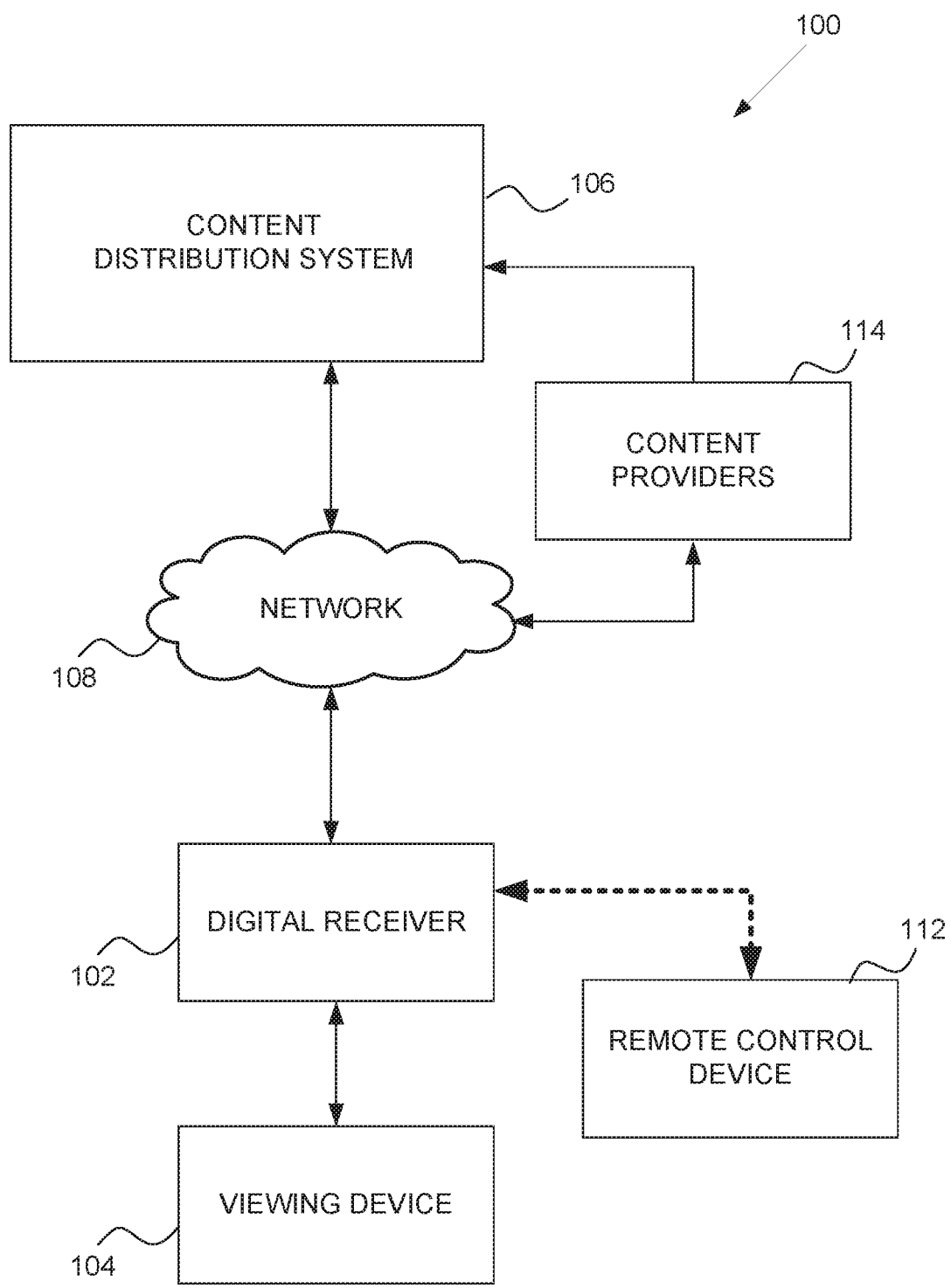
FIG. 1 is a diagram illustrating an example environment for configuring a remote control device to display application dependent control frames in accordance with an example embodiment.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments described herein provide systems and methods for configuring remote control devices to display application dependent control frames of a remote control user interface, and for causing display of such application dependent control frames when a corresponding application is in focus (e.g., selected to be primarily displayed on a viewing device). Each remote control frame corresponds to a state of the corresponding application (e.g., particular type, menu, or screen being accessed for the corresponding application such as streaming control, menu selection, or settings) that may be displayed on a viewing device. The remote control frame may comprise one or more selectable components (e.g., buttons, icons, tabs), images (e.g., logos), text, or functionalities (e.g., swipes) specific to the corresponding application. For example, a remote control frame created for Netflix may comprise a Netflix logo, buttons or gestures (e.g., swiping) for control of functions related to searching or viewing content (e.g., play button, fast forward button, stop button), images of content offered by Netflix, and so forth. In contrast, a remote control frame for a weather application may comprise a logo of the weather application, buttons for displaying location specific weather information, selectable images or text to obtain more detailed forecast information (e.g., hourly, 7 day forecast), and so forth. Thus, different applications use different commands and different ways of interacting with the remote control device. Example embodiments provide systems and methods that allow the remote control device to automatically switch to a user interface (e.g., a remote control frame) that corresponds to a state of the application in focus while the systems and methods retain last remote control settings (corresponding to a last remote control frame) for each application running in background.

In example embodiments, a plurality of applications are running at the same time. Accordingly, one application is in focus (e.g., application that is the primary application being displayed on a viewing device for which remote controls should be available; referred to herein as "primary application") and one or more applications are running in background (e.g., applications that are loaded/activated but not primarily displayed on the viewing device; referred to herein as "background applications"). The example system detects the primary application and automatically causes a corresponding remote control frame to be displayed on a display of the remote control device. In response to a switch in applications (e.g., a background application switched to become the primary application), the system automatically retrieves configuration information (e.g., instructions for remote control settings) for a last remote control frame (or initial remote control frame based on the primary application being initiated) and provides the configuration information to the remote control device. Using the configuration information, the remote control device generates and displays the remote control frame for a current state of the new primary application.

As a result, one or more of the methodologies described herein facilitate solving the technical problem of having a single remote control device capable of controlling a plurality of applications running on a device (e.g., receiver device). The methodologies including running a plurality of applications at a receiver device. The logic then detects a switch command that causes a background application to become a primary application. The logic switches the background application to become the primary application, whereby the switch causes a previous primary application to become a new background application. The logic retrieves, from a datastore, configuration information for (last) remote control settings corresponding to a last state of the primary application, and transmits the configuration information for the remote control settings to the remote control device. The configuration information for the remote control settings causes a remote control frame corresponding to the last state of the primary application to replace, on a display of the remote control device, a remote control frame corresponding to the previous primary application. By using embodiments of the present invention, a single remote control device can be used to present application specific user interfaces for control of a plurality of applications. Accordingly, one or more of the methodologies discussed herein may obviate a need for having multiple remote control devices for controlling different applications.

With reference to FIG. 1, an embodiment of an example environment 100 that enables configuring a remote control device 112 to dynamically display application dependent control frames of a remote control user interface is shown. In example embodiments, a digital receiver 102 of a user provides access to digital content. In one embodiment, the digital receiver 102 is a set-top box. The digital receiver 102 is coupled to a viewing device 104 (e.g., a television or monitor) on which the user can view the digital content. In some embodiments, the digital receiver 102 may be combined with the viewing device 104 (e.g., a smart television).

Since the user accesses the digital content through the digital receiver 102, the digital receiver 102 is configured to receive commands with respect to the digital content and content user interfaces generated (or cause to be generated) by the digital receiver 102 for display on the viewing device 104. In example embodiments, the commands include instructions to navigate content, search content, or perform other actions with respect to content displayed on the viewing device 104 or accessible through a network 108. The instructions causes the digital receiver 102 to, in accordance with one embodiment, update the content user interface displayed on the viewing device 104 based on the commands.

In example embodiments, a remote control device 112 is used to provide the commands to the digital receiver 102 by sending a signal to the digital receiver 102 to control viewing of and interactions with the content displayed on viewing device 104 and to access content via the network 108. Additionally, the remote control device 112 receives instructions from the digital receiver 102 that configure (e.g., set up, change) the user interface being displayed on the remote control device 112. Accordingly, a two-way communication link exists (e.g., established, maintained) between the receiver device 102 and the remote control device 112. In one embodiment, Bluetooth is used by the receiver device 102 to send configuration information (representing remote control settings) corresponding to the primary application in focus (e.g., currently being displayed on the viewing device 104).

In some embodiments, a content distribution system 106 provides content data, over a network 108 to the digital receiver 102 for display on the viewing device 104. The content distribution system 106 comprises a control center (e.g., one or more servers) where various signals (e.g., associated with content) may be received, monitored, and processed. The content distribution system 106 obtains (e.g., accesses, receives, retrieves) data from one or more content providers 114 for distribution to the digital receiver 102. In example embodiments, each content provider 114 comprises a third party service (e.g., Netflix, Hulu, YouTube, Amazon, Weather.com) that stores and provides content, such as, for example but not limited to, over-the-top (OTT) content, video-on-demand (VOD) content, Internet content, or broadcast content, to the content distribution system 106 or the digital receiver 102 via the network 108. The content comprises text, images, audio, and/or video content (e.g., movies, television shows, videos, webpages). In some embodiments, the content providers 114 provides their content directly to the digital receiver 102 via the network 108 (e.g., instead of through the content distribution system 106).

One or more portions of the network 108 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, a satellite network, a cable network, another type of network, or a combination of two or more such networks. Any one or more portions of the network 108 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

It is noted that the environment 100 shown in FIG. 1 is merely an example. For instance, any number of content providers 114 may be embodied within the environment 100. Additionally, some components of the environment 100 may be combined. For example, the digital receiver 102 may be embodied within the viewing device 104 to form a single device (e.g., a smart television). Furthermore, operations discussed as occurring at the remote control device 112 may be performed at the digital receiver 102 or vice-versa.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Moreover, any two or more of the systems or machines illustrated in FIG. 1 may be combined into a single system or machine, and the functions described herein for any single system or machine may be subdivided among multiple systems or machines.

Figure 2:
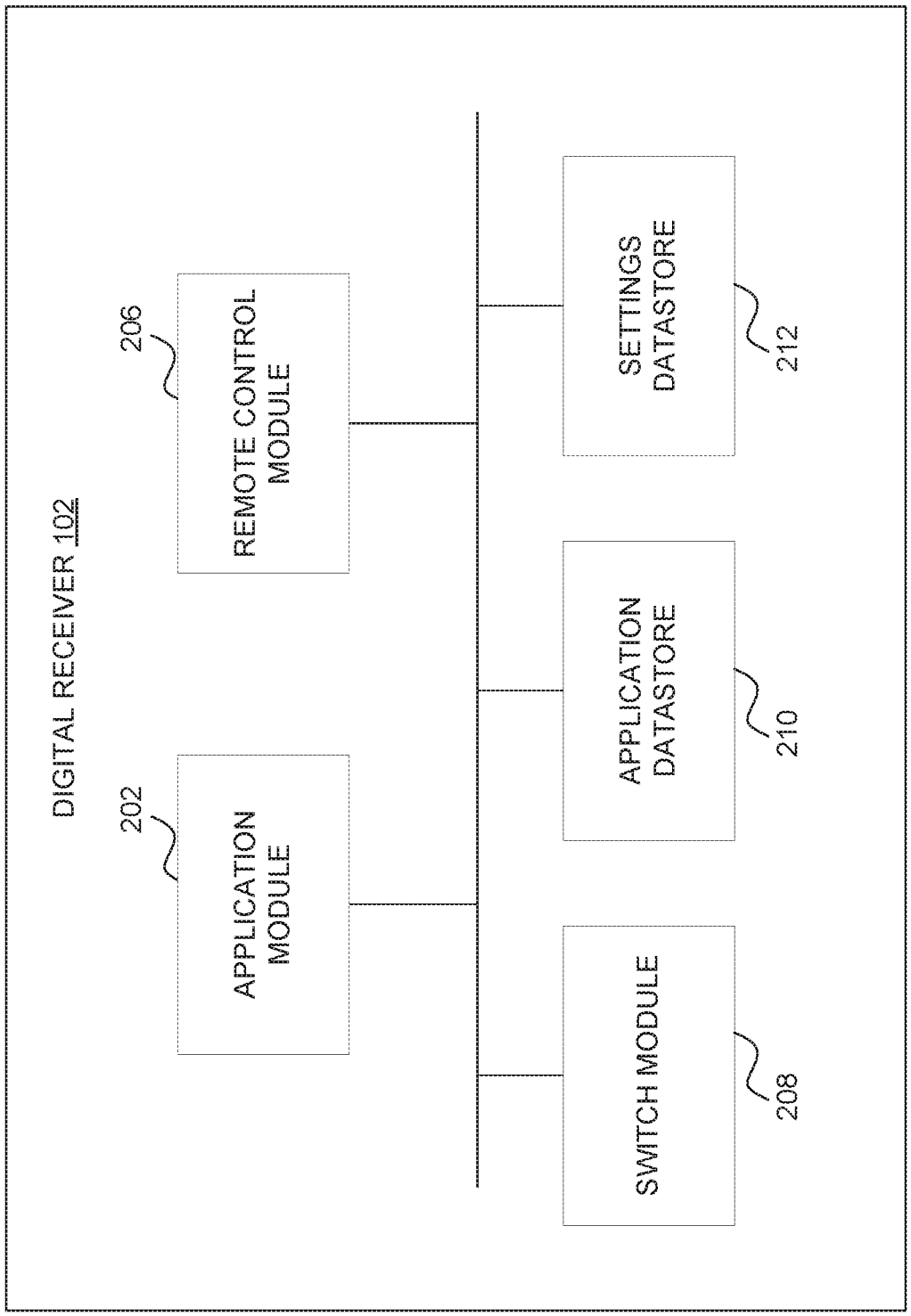
FIG. 2 is a block diagram illustrating an example embodiment of components within a digital receiver in accordance with an example embodiment.

FIG. 2 is a block diagram illustrating an example embodiment of components within the digital receiver 102 in accordance with an example embodiment. In example embodiments, the digital receiver 102 manages and runs applications, monitors for a switch in the primary application, and transmits configuration information to the remote control device 112 to cause display of a remote control frame for a current state of the primary application. To enable these operations, the digital receiver 102 comprises an application module 202, a remote control module 206, a switch module 208, an application datastore 210, and a settings datastore 212 all of which may be configured to communicate with each other (e.g., over a bus, shared memory, or a switch).

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components may be embodied within the digital receiver 102 while others are embodied within the remote control device 112.

The digital receiver 102 may comprise other components not pertinent to example embodiments that are not shown or discussed.

The application module 202 manages applications that are stored (e.g., permanently or temporarily) on the digital receiver 102. In example embodiments, the application module 202 accesses applications stored at the application datastore 210 when a user activates an application with the digital receiver 102 and causes the application to be loaded and running at the digital receiver 102. Alternatively, the application module 202 fetches an application on-demand from a remote server and temporarily stores the application in the receiver. Loading and running the application may cause a content user interface corresponding to the application to be displayed on the viewing device 104, and triggers the digital receiver 102 to configure the remote control device 112 to display the initial or default remote control user interface (e.g., an initial remote control frame established for the application). The applications may be pre-installed or later installed (e.g., downloaded) to the application datastore 210 or fetched when needed from the remote server by the user. Example applications include applications for content streaming services (e.g., Amazon, Netflix, YouTube), Internet services (e.g., any website), or any other networked service having content accessible via the network 108.

Because each of the applications can have customized remote control user interfaces (e.g., customized to the look and feel of the application), a developer or other personnel associated with an application provides code or instructions in the application to set up, for each state of the application, a customized remote control frame. In example embodiments using a simplified approach, the instructions configure a predefined limited number of remote control modes for a limited number of common usages. That is, a remote control mode that best matches a behavior of a current screen or content user interface of the application to be displayed on the viewing device 104 can be selected. In some embodiments, there may be a predefined mode for each type of major screen (e.g., streaming control, menu selection, settings) and dynamic customization is limited to the definition of active buttons. For example, a classic remote control user interface with buttons and key pads may be configured to operate with functions of the application. The customization may include customized selection areas (e.g., text or icon buttons, in cards or panels), touchpad area for swiping objects, a possible predefined active area that provides limited customization, or any combinations of these. In example embodiments, the predefined modes can be defined by the digital receiver 102 or directly by the remote control device 112. If the digital receiver 102 defines the predefined modes, then corresponding configuration information for the predefined modes are stored in the setting datastore 212.

In other example embodiments, dynamic definitions are used to customize the remote control user interface. In these embodiments, instructions or code in an application (e.g., Netflix application, Amazon application) can rebrand the remote control user interface to look and behave like the application (e.g., with corresponding logos and similar placement of active areas as on a website) and define controls that are more appropriate for the application's use. The dynamic definitions are provided via a programming language (e.g., similar to HTML) that is specifically designed for remote control user interface presentation. An example of a programming language that can be used is discussed below in connection with FIG. 5A. In these embodiments, because an entire remote control look and feel is dynamically redefined and the definition language published, an application can freely create the most appropriate virtual remote control (e.g., remote control user interface).

The remote control module 206 manages the display of user interfaces at the remote control device 112. In example embodiments, the digital receiver 102, via the remote control module 206, retrieves and transmits to the remote control device 112, configuration information for a remote control frame corresponding to a current state of the primary application. The configuration information for the remote control frame corresponding to a last state of the primary application is also stored (e.g., in the settings datastore 212) by the remote control module 112. If an application running in the background has a state change, a remote control frame of the background applications that corresponds to a new state may also be stored (or updated) in the settings datastore 212. By storing the current definitions for a last remote control frame for each active (e.g., running) application, the digital receiver 102 can quickly recall/retrieve configuration information when the corresponding application is switched from being a background application to a primary application. The remote control module 206 also receives control signals from the remote control device 206 which includes actions performed on the remote control frame (e.g., swipes, selections of icons or buttons) which may cause display of a next remote control frame or change in content displayed on the viewing device 104.

The switch module 208 manages switching of applications at the digital receiver 102 and switching of the remote control user interface presented on the remote control device 112. In example embodiments, the switch module 208 monitors for a signal from the remote control device 112 (e.g., received via the remote control module 206) indicating a request to change the primary application at the digital receiver 102 (or monitors for the change in the primary application). When a change is detected that causes activation of a new application, the switch module 208 instructs (e.g., transmits instructions or a trigger) the application module 202 to activate the new application. The switch module 208 also instructs (e.g., transmits instructions or a trigger) the remote control module 206 to retrieve initial configuration information for the new application and to transmit the configuration information for a remote control frame (e.g., corresponding to a homepage, start page, or other initial remote control frame for the new application) to the remote control device 112. In example embodiments, initial configuration information (which may be the same for all applications) may be changed by its respective application. In embodiments where the switch module 208 detects a switch of a background application to become in-focus as a primary application, the switch module 208 instructs (e.g., transmits instructions or a trigger) the remote control module 206 to retrieve the configuration information (e.g., dynamic definitions for the last remote control frame) from the settings datastore 212 and to transmit the configuration information to the remote control device 112.

Figure 3:
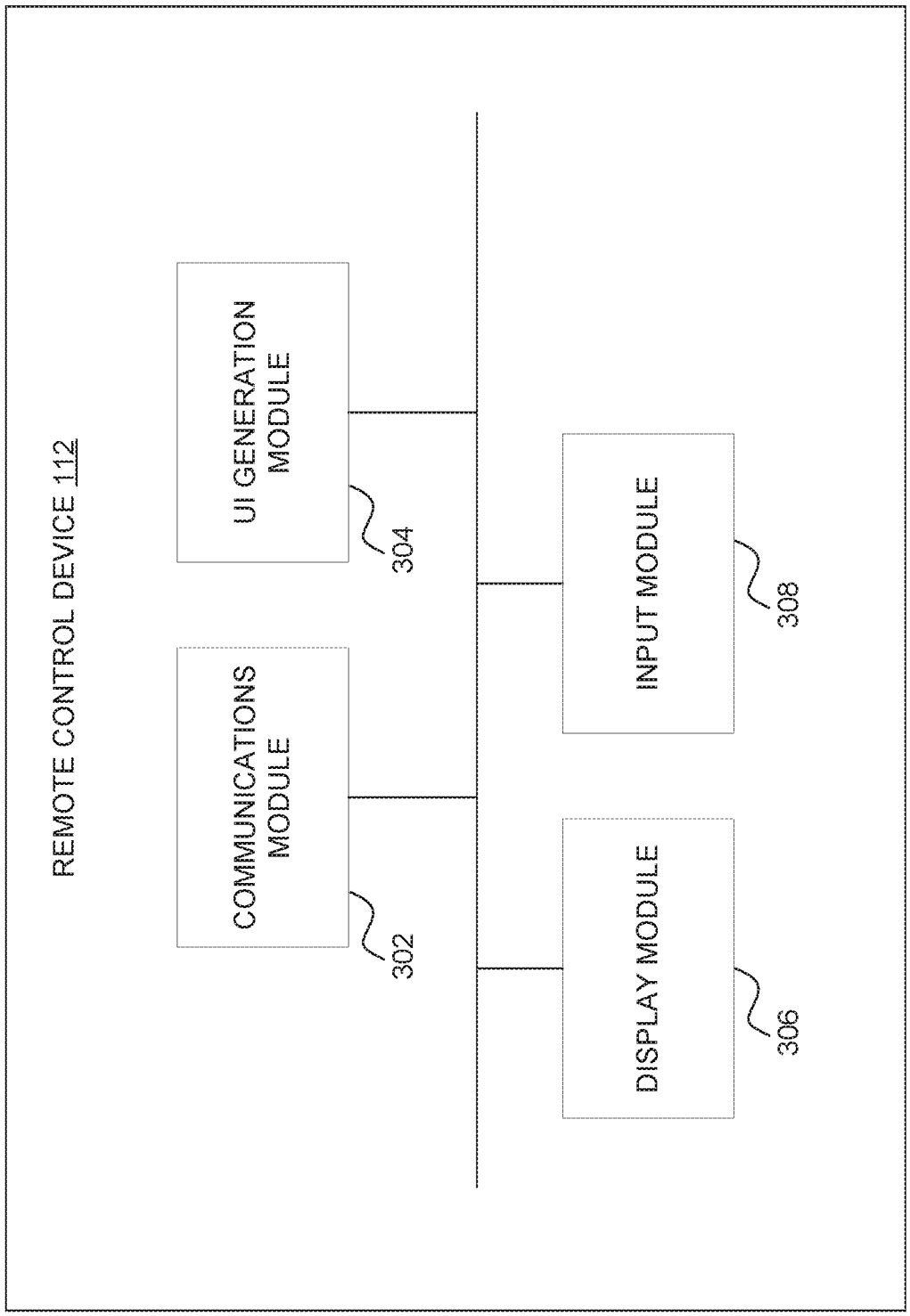
FIG. 3 is a block diagram illustrating an example embodiment of components within the remote control device.

FIG. 3 is a block diagram illustrating an example embodiment of components within the remote control device 112. The remote control device 112 is a "smart" device with intelligence to understand the configuration information received from the digital receiver 102 and generate and display, based on the configuration information, a remote control frame corresponding to a current state of the primary application. To enable these operations, the remote control device 112 comprises a communications module 302, a user interface generation module 304, a display module 306, and an input module 308 all of which may be configured to communicate with each other (e.g., over a bus, shared memory, or a switch).

The communications module 302 manages the exchange of communications with the digital receiver 102 (and/or the viewing device 104 (e.g., via the remote control module 206)). In example embodiments, the communications module 302 receives (e.g., via Bluetooth) configuration information used for generating remote control frames for display on the remote control device 112. The communications module 302 also provides signals/commands to the digital receiver 102 to control display of content on the viewing device 104.

The user interface generation module 304 generates the remote control frames from the received configuration information. In example embodiments, the user interface generation module 304 processes the configuration information and positions functional components (e.g., icons, buttons, swipe areas) according to the configuration information. In some embodiments, the user interface generation module 304 also includes, based on the configuration information, specific logos, color schemes, and other behaviors that represent the look and feel of the primary application.

The display module 306 causes the display of the generated remote control frames on the remote control device 112. In example embodiments, the remote control device 112 comprises a touch screen on which the remote control frames can be displayed, and from which user touch inputs may be received.

The input module 308 manages the receipt of inputs at the remote control device 112. Accordingly, the input module 308 detects when a functional component displayed on the user interface (e.g., on one of the remote control frames) is activated. For example, the input module 308 detects when a button or icon is selected or when a swipe is performed. The detected input may cause the remote control device 112 to perform an action. In some embodiments, the action may comprise sending a communication to the receiver device 102, via the communications module 302, indicating the received input (e.g., a request to play a selection, to pause a selection, to search, to switch the primary application), which causes the receiver device 102 to perform a corresponding action.

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components may be embodied within the digital receiver 102 while others are embodied within the remote control device 112.

The digital receiver 102 may comprise other components not pertinent to example embodiments that are not shown or discussed.

Figure 4:
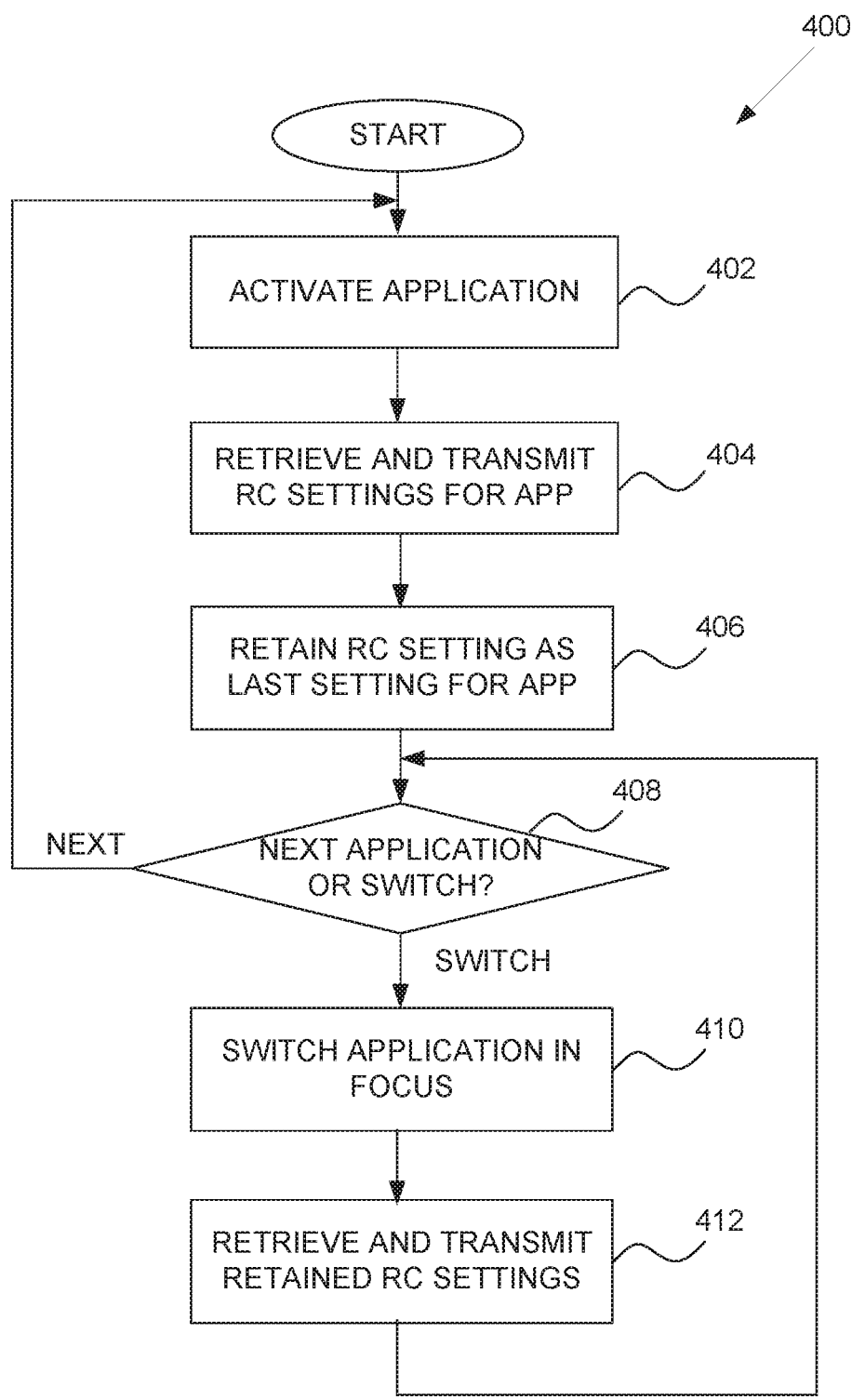
FIG. 4 is a flow diagram of an example method for configuring, by the digital receiver, a remote control device to display application dependent control frames in accordance with an example embodiment.

FIG. 4 is a flow diagram of an example method 400 for configuring, by the digital receiver 102, the remote control device 112 to display application dependent control frames in accordance with an example embodiment. Operations in the method 400 may be performed by the receiver device 102, using one or more modules described above with respect to FIG. 2. Accordingly, the method 400 is described by way of example with reference to the receiver device 102. However, it shall be appreciated that at least some of the operations of the method 400 may be deployed on various other hardware configurations or be performed by similar components residing elsewhere in the network environment 100. Therefore, the method 400 is not intended to be limited to the receiver device 102.

In operation 402, an application is activated and becomes the primary application. Accordingly, the application module 202 accesses (e.g., from the application datastore 210) and loads the application. Upon loading the application, the receiver device 102 causes a display (e.g., content user interface) corresponding to the first application to be presented on the viewing device 104.

In operation 404, the remote control module 206 retrieves and transmits the configuration information (e.g., for remote control settings) for an initial state of the application. The retrieved configuration information is transmitted to the remote control device 112. The configuration information causes the remote control device 112, via the user interface generation module 304, to generate a remote control frame that corresponds to the current state (e.g., corresponding to what is displayed on a screen of the view device 104) of the application and to display, via the display module 306, the remote control frame on a display of the remote control device 112. An example of the configuration information (e.g., definition language) is discussed in FIG. 5A below.

In operation 406, the remote control module 206 retains a current remote control settings as the last settings for the application. In example embodiments, the remote control module 206 stores the last remote control settings in the settings datastore 212. It is noted that the remote control settings may change for the primary application (e.g., new remote control frames displayed), for example, as inputs (e.g., selections of functional components) are received from the remote control device 112, new content becomes available, or an error occurs.

The receiver device 112 monitors for a change in the primary application. In operation 408, a determination is made by the receiver device 102 (e.g., the application module 202) as to whether a next application is activated or a switch detected. If a next application is activated, the method 400 returns to operation 402. The activation of the next application causes the (first) application to become a background application and the next application to become the primary application. With the activation of the next application, the configuration information for remote control settings for an initial state of the next application is retrieved and transmitted in operation 404, and retained as last remote control settings for the next application in operation 406.

Alternatively, a switch may be detected in operation 408 (e.g., the switch module 208 monitors for any switch in the primary application). In example embodiments, the switch is initiated by a signal or indication received from the remote control device 112. The switch causes a selection of a background application to become a primary application.

In operation 410, a current primary application is switched to a background application and the selected background application is switched to the primary application (e.g., by the application module 202). Accordingly, the receiver device 102 causes the selected background application to become in-focus on the viewing device 104.

In operation 412, the receiver device 102 (e.g., the remote control module 206) retrieves and transmits configuration information for the last remote control settings for the new primary application to the remote control device 112. The configuration information for the last remote control settings will cause a last (previous) remote control frame corresponding to a last state of the primary application to be displayed on the remote control device 112. As such, the user can pick up from where they left off on the primary application (e.g., instead of starting at a start or home page of the primary application).

FIG. 5A is an example of user interface programming language used to establish a remote control frame for an application. More specifically, FIG. 5A is an example showing how an application (e.g., Netshow) can set up the remote control device 112 for use with its current screen on the viewing device 104, by sending a remote control frame (e.g., sending configuration information for the remote control frame). For instance, the programming language provides that the background is black, and selecting a button on the user interface returns a button ID and a new button state to the application. Furthermore, swiping images move the images on a left side or a right side (e.g., swipe is declared as direction="horizontal") and returns a swipe event with a swipe ID causing new content to be positioned in a row relative to a beginning. Additionally, a play button is displayed at a bottom left while a My List button is displayed adjacent to the play button.

Communication between each application and the remote control device 112 goes through middleware (e.g., the remote control module 206) in the digital receiver 102, which remembers a current (e.g., last) remote control frame for each activated application, and provides instructions and images on demand or pushed to the remote control device 112 when the application becomes the primary application. In some embodiments, the receiver device 102 may convert .jpeg images into a native bitmap format that the remote control device 112 can directly render on its display screen.

Figure 5B:
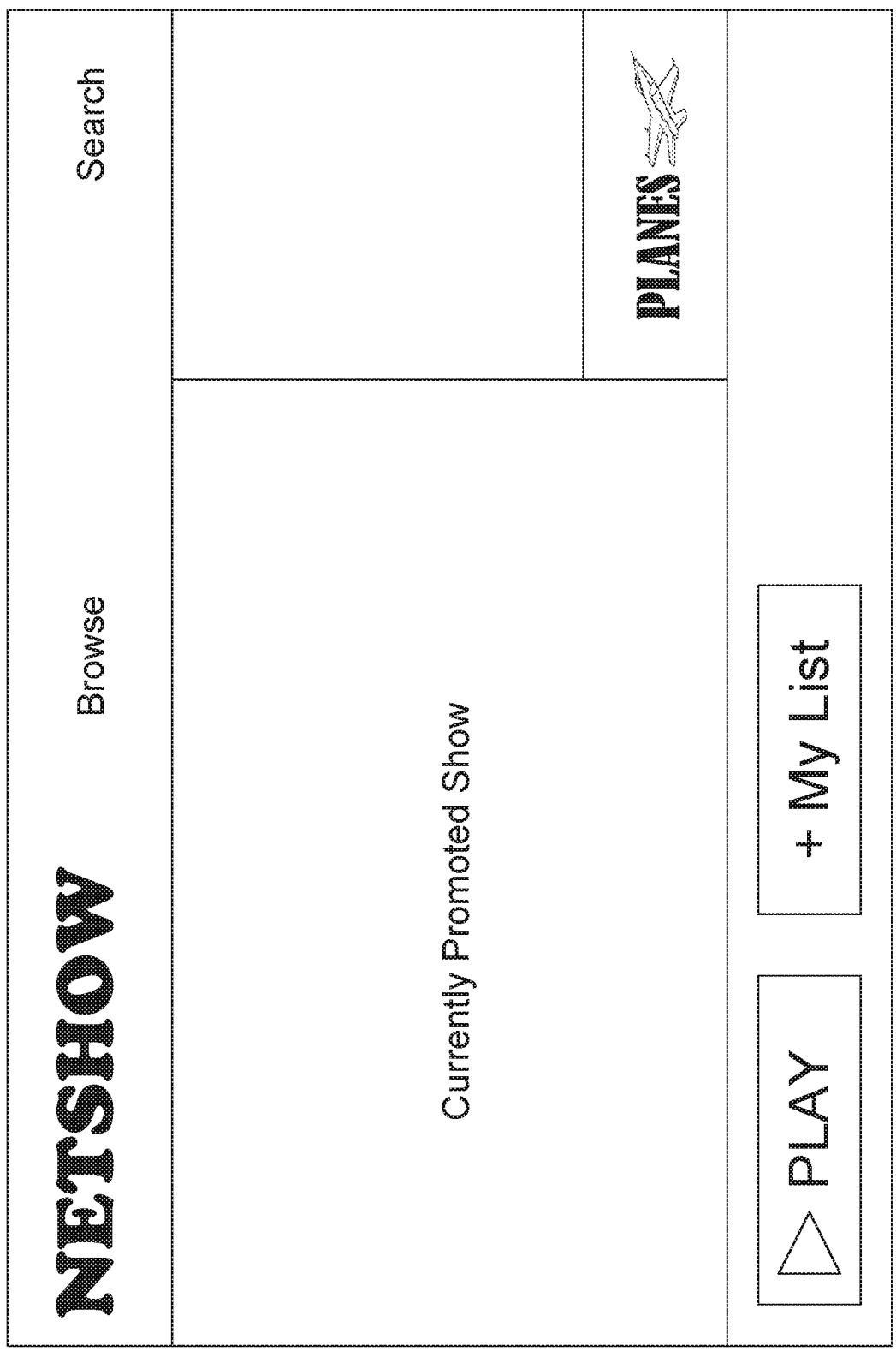
FIG. 5B illustrates the example remote control frame established by the remote control frame description language of FIG. 5A.

FIG. 5B illustrates the user interface established by the user interface programming language of FIG. 5A. If the user selects one of the buttons on the remote control frame (e.g., search, browse, play, My List), the receiver device 102 is notified of the selection. The receiver device 102 can then reconfigure the remote control 112 to present a new/next remote control frame comprising a new set of images, icons, buttons, or swipe areas by sending configuration information for the new/next remote control frame.

Furthermore, if the user selects a system button (not shown), a receiver device main user interface becomes in focus (e.g., be primarily displayed) on the viewing device 104, and the receiver device 102 causes a reload of a main user interface frame on the remote control device 112 that corresponds to the main user interface frame. The main user interface frame may comprise a list of activated applications (e.g., applications running in focus and background) and/or a list of available (non-activated) applications. In some embodiments, the main user interface frame allows faster switching to another running application (in background). In this embodiment, the receiver device 102 changes focus to that application on the viewing device 104 and automatically causes reload of a corresponding remote control frame for that application (e.g., the last stored remoted control frame) at the remote control device 112.

Figure 6:
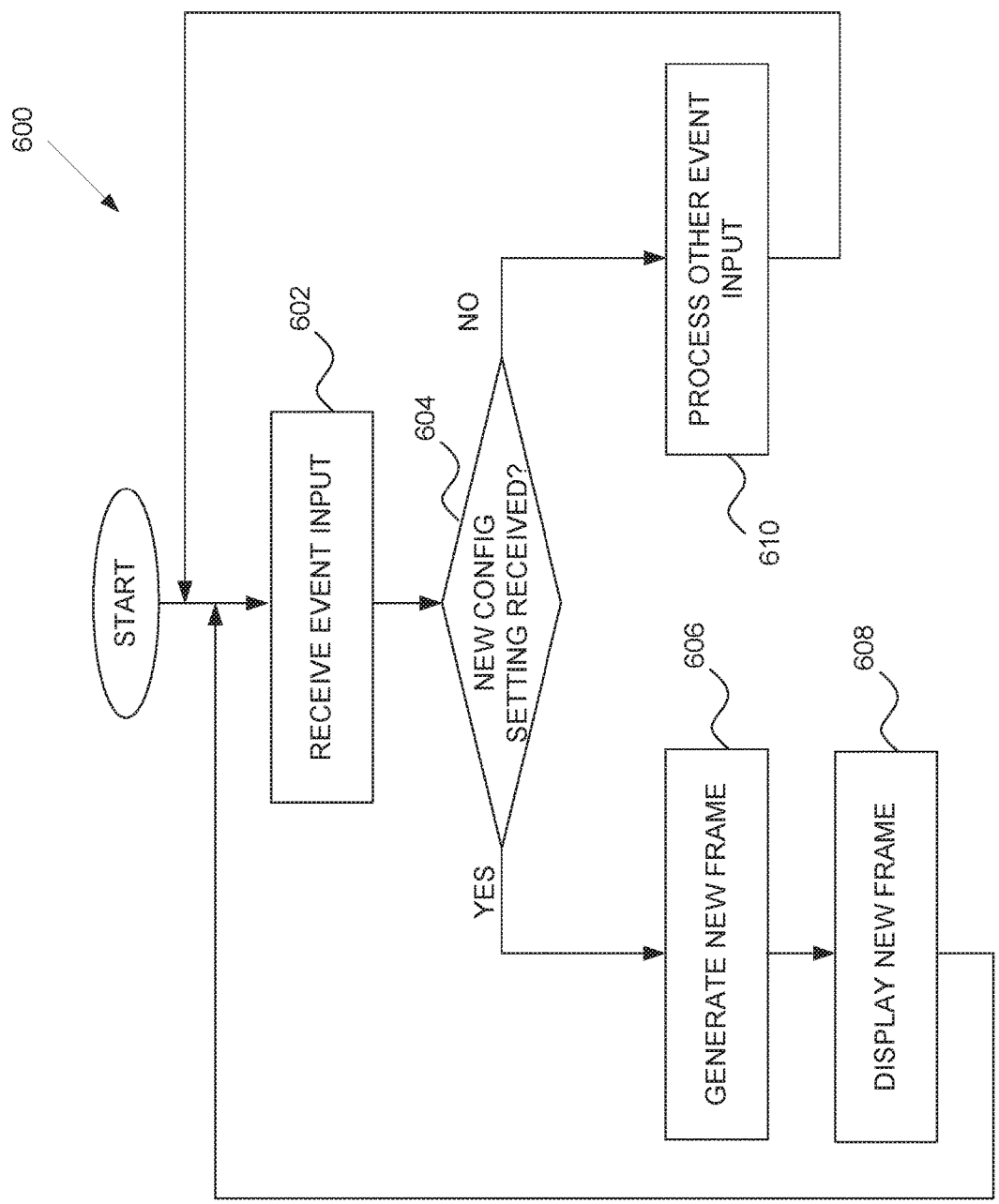
FIG. 6 is a flow diagram of an example method for displaying, at a remote control device, remote control frames using configuration information received from the digital receiver in accordance with an example embodiment.

FIG. 6 is a flow diagram of an example method 600 for displaying, at the remote control device 112, remote control frames using configuration information (e.g., code representing settings or dynamic definitions) received from the digital receiver 102 in accordance with an example embodiment. Operations in the method 600 may be performed by the remote control device 112, using one or more modules described above with respect to FIG. 3. Accordingly, the method 600 is described by way of example with reference to the remote control device 112. However, it shall be appreciated that at least some of the operations of the method 600 may be deployed on various other hardware configurations or be performed by similar components residing elsewhere in the network environment 100. Therefore, the method 600 is not intended to be limited to the remote control device 112.

In operation 602, the communications module 302 of the remote control device 112 receives an event input. In some embodiments, the event input comprises the configuration information for a remote control frame (e.g., initial or next remote control frame) for a state (e.g., initial or subsequent state) of an application. A next remote control frame is a user interface for a different state, and possibly for a different application (e.g., the primary application is switched) than the initial control frame. For example the initial remote control frame may comprise a homepage for a content provider 114, while the next remote control frame may comprise a content selection user interface for a particular genre that was selected from the homepage. In example embodiments, an initial remote control frame is the same for all applications.

In one embodiment, the configuration information may cause configuration of a selection of a predefined plurality of buttons or other functional components and/or placement of such selections in particular areas of the remote control frame. In other embodiments, the configuration information comprises programming language (e.g., similar to HTML) that provides instructions as to what icons, images, color schemes, logos, and other visual components should be displayed and where these visual component should be located on the remote control frame.

Alternatively, the event input may comprise an input received by the input module 308 that causes performance of an operation at the remote control device 112 or the digital receiver 102. For example, the input module 308 detects when a button or icon is selected or when a swipe is performed. The detected input may cause the remote control device 112 to perform an action.

In operation 604, a determination is made as to whether the event input comprises configuration information received by the communication module 302 or an input received by the input module 308.

If the event input comprises configuration information, then in operation 606, the user interface generation module 304 generates a new remote control frame from the received configuration information. In example embodiments, the user interface generation module 304 processes the configuration information and positions functional components (e.g., icons, buttons, swipe areas) according to the configuration information.

In operation 608, the display module 306 causes the display of the generated new remote control frame on the remote control device 112. In example embodiments, the remote control device 112 comprises a touch screen on which the remote control frames can be displayed, and from which user touch inputs may be received.

If the event input is an input received by the input module 308, then in operation 610, the input is processed. For example, the input module 308 detects when a button or icon is selected or when a swipe is performed. The detected input may cause the remote control device 112 to perform an action, such as, sending a communication to the receiver device 102, via the communications module 302, indicating the received input (e.g., a request to play a selection, to pause a selection, to search, to switch the primary application). The communication may cause the receiver device 102 to perform a corresponding action. In some embodiments, the operation may result in a next set of configuration information being sent by the receiver device 102.

Figure 7A:
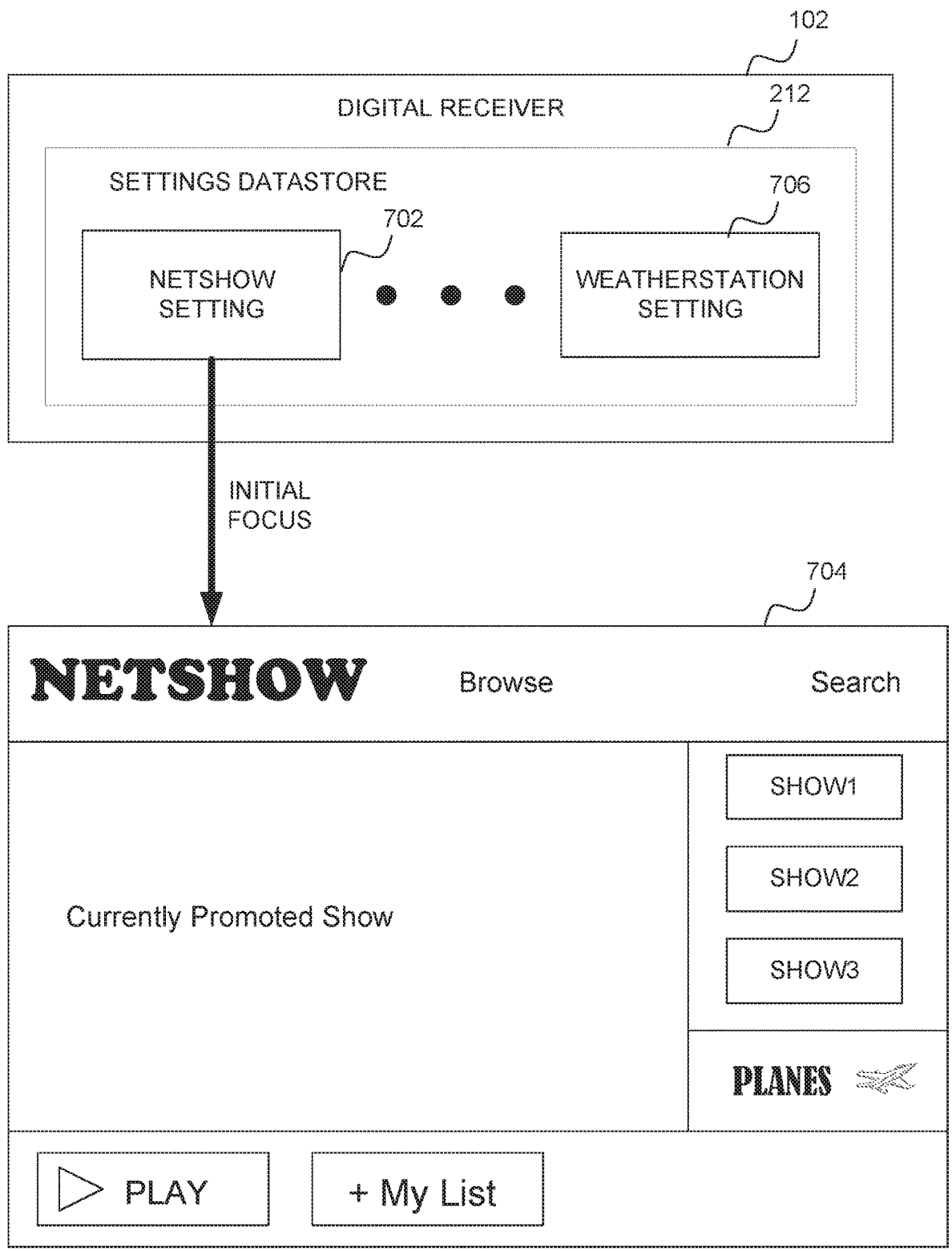
FIG. 7A-7B illustrate an example of a switch of the application dependent control frame displayed on the remote control device.
Figure 7B:
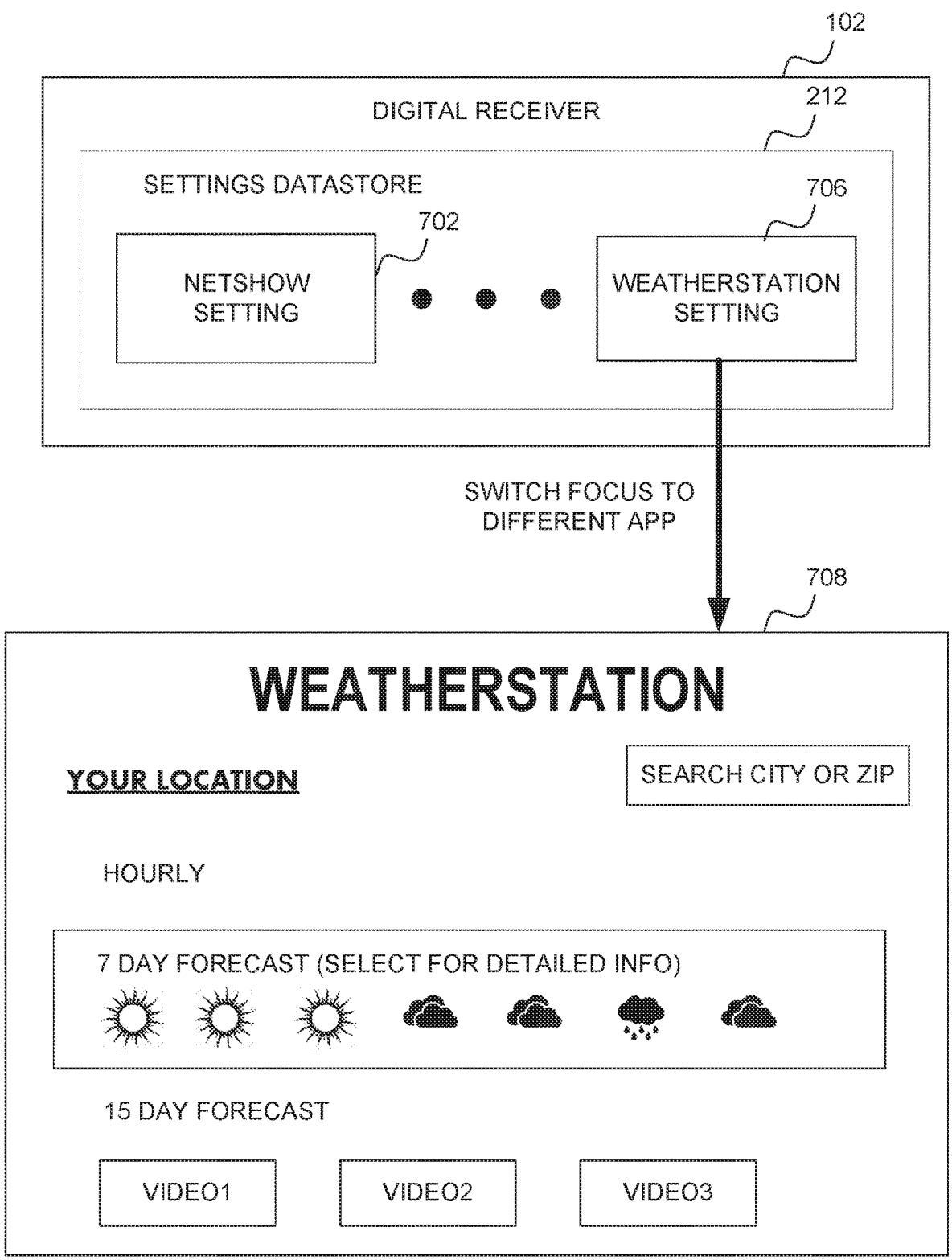

FIG. 7A-7B illustrate an example of a switch of the (application dependent) remote control frame displayed on the remote control device 112. Initially, in the example, the primary application is Netshow. Accordingly, the digital receiver 102 provides configuration information for remote control settings 702 for Netshow to the remote control device 112. The remote control settings 702 cause a display of a corresponding Netshow remote control frame 704 on a display of the remote control device 112.

When a user switches the application in focus to Weatherstation, the digital receiver 102 retrieves and sends configuration information for last remote control settings for Weatherstation 706 to the remote control device 112 as shown in FIG. 7B. The configuration information for the last remote control settings for Weatherstation 706 causes a display of a corresponding Weatherstation remote control frame 708 on the display of the remote control device 112. As shown, the icons, logos, and functional components as well as color schemes displayed on the remote control device 112 changes with the switch in the primary application.

Figure 8:
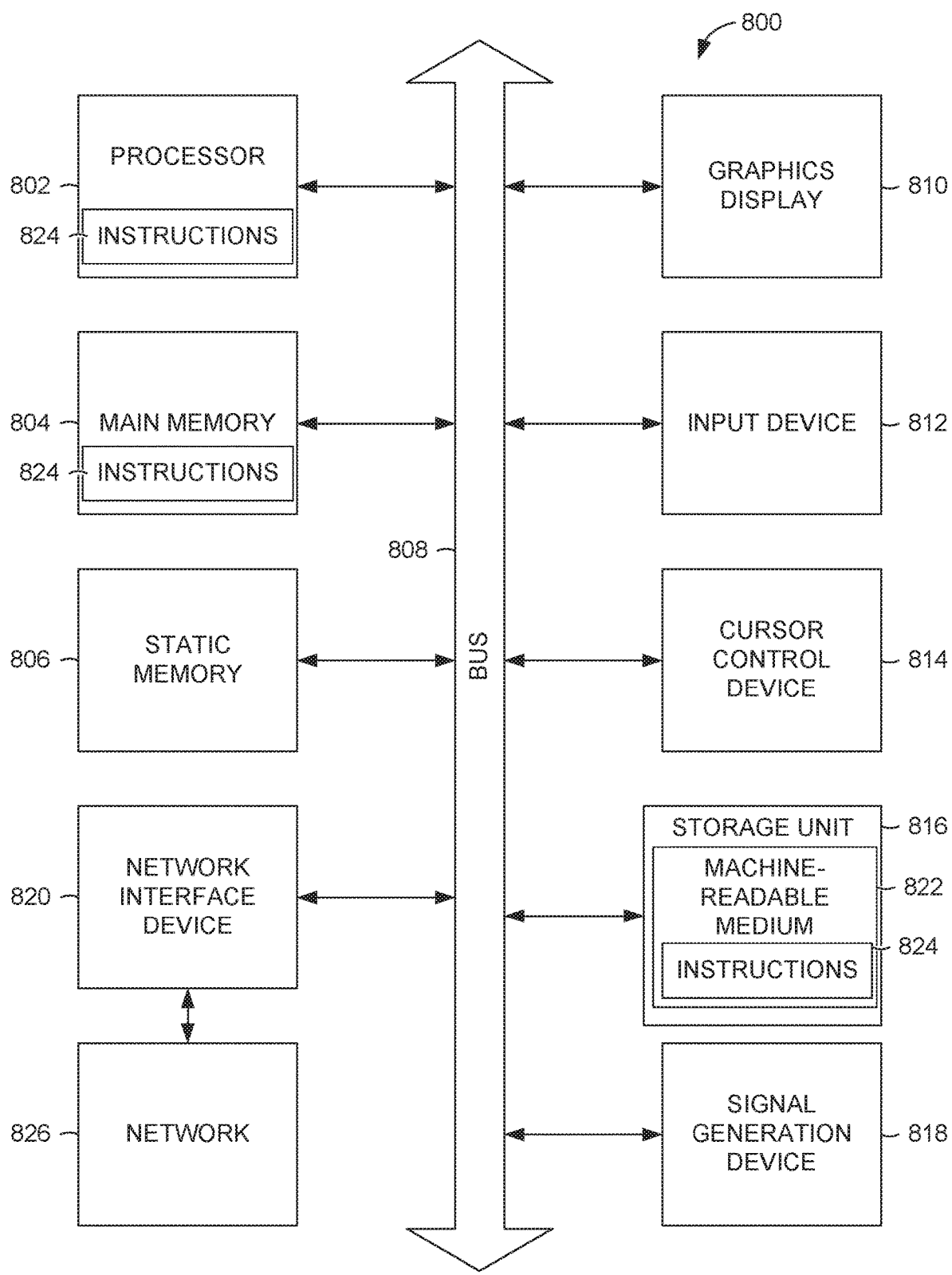
FIG. 8 is a diagrammatic representation of a machine in an example form of a computing system within which a set of instructions may be executed for causing the machine to perform any one or more of the methodologies discussed herein, according to an example embodiment.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIGS. 4 and 6. The instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media 822 (e.g., tangible and non-transitory machine-readable media).

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown, in an example embodiment, to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions 824 for execution by a machine (e.g., machine 800), such that the instructions 824, when executed by one or more processors of the machine 800 (e.g., processor 802), cause the machine 800 to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device."

Furthermore, the machine-readable medium 822 is non-transitory in that it does not embody a propagating or transitory signal. However, labeling the machine-readable medium 822 as "non-transitory" should not be construed to mean that the medium is incapable of movement—the medium should be considered as being transportable from one physical location to another. Additionally, since the machine-readable medium 822 is tangible, the medium may be considered to be a hardware storage device.

Furthermore, the machine-readable medium 822 does not comprise any transitory signals. In some example embodiments, the instructions 824 for execution by the machine 800 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 824)

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 822 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Examples

Example 1 is a method for configuring an application dependent remote control device. The method comprises running, by a receiver device, a plurality of applications at the receiver device, detecting, by the receiver device, a switch command, the switch command causing a background application to become a primary application, the primary application being the application in focus on a display device; switching, by a hardware processor of the receiver device, the background application into the primary application, the switching causing a previous primary application to become a new background application; retrieving, by the receiver device from a settings datastore, configuration information for remote control settings corresponding to the primary application; and causing, by the receiver device and based on the configuration information for the remote control settings, a remote control frame corresponding to the primary application to replace, on a display of the remote control device, a remote control frame corresponding to the previous primary application.

In example 2, the subject matter of example 1 can optionally include wherein the remote control settings comprises remote control settings for a last state of the primary application stored in the settings datastore.

In example 3, the subject matter of examples 1-2 can optionally include storing remote control settings corresponding to a last state of the previous primary application to the settings datastore prior to the previous primary application being switched to become the new background application.

In example 4, the subject matter of examples 1-3 can optionally include wherein each of the plurality of applications comprises configuration information for a plurality of remote control frames, each remote control frame of the plurality of remote control frames corresponding to a different state of an application.

In example 5, the subject matter of examples 1-4 can optionally include wherein the configuration information configures a predefined number of remote control modes for a number of common usages.

In example 6, the subject matter of examples 1-5 can optionally include wherein the configuration information comprises programming language indicating dynamic definitions that establish the remote control frames for each of the plurality of applications.

In example 7, the subject matter of examples 1-6 can optionally include activating and loading a new application, the new application becoming a new primary application; causing the primary application to become a next new background application; retrieving configuration information for remote control settings for the new primary application; and causing, based on the configuration information for the remote control settings for the new primary application, a remote control frame corresponding to the new primary application to be displayed at the remote control device.

Example 8 is a system for configuring an application dependent remote control device. The system includes one or more processors configured to perform operations comprising running a plurality of applications at the receiver device; detecting a switch command, the switch command causing a background application to become a primary application, the primary application being the application in focus on a display device; switching the background application into the primary application, the switching causing a previous primary application to become a new background application; retrieving, from a settings datastore, configuration information for remote control settings corresponding to the primary application; and causing, based on the configuration information for the remote control settings, a remote control frame corresponding to the primary application to replace, on a display of the remote control device, a remote control frame corresponding to the previous primary application.

In example 9, the subject matter of example 8 can optionally include wherein the remote control settings comprises remote control settings for a last state of the primary application stored in the settings datastore.

In example 10, the subject matter of examples 8-9 can optionally include storing remote control settings corresponding to a last state of the previous primary application to the settings datastore prior to the previous primary application being switched to become the new background application.

In example 11, the subject matter of examples 8-10 can optionally include wherein each of the plurality of applications comprises configuration information for a plurality of remote control frames, each remote control frame of the plurality of remote control frames corresponding to a different state of an application.

In example 12, the subject matter of examples 8-11 can optionally include wherein the configuration information configures a predefined number of remote control modes for a number of common usages.

In example 13, the subject matter of examples 8-12 can optionally include wherein the configuration information comprises programming language indicating dynamic definitions that establish the remote control frames for each of the plurality of applications.

In example 14, the subject matter of examples 8-13 can optionally include activating and loading a new application, the new application becoming a new primary application; causing the primary application to become a next new background application; retrieving configuration information for remote control settings for the new primary application; and causing, based on the configuration information for the remote control settings for the new primary application, a remote control frame corresponding to the new primary application to be displayed at the remote control device.

Example 15 is a hardware storage device for configuring an application dependent remote control device. The hardware storage device configures one or more processors to perform operations comprising running a plurality of applications at the receiver device; detecting a switch command, the switch command causing a background application to become a primary application, the primary application being the application in focus on a display device; switching the background application into the primary application, the switching causing a previous primary application to become a new background application; retrieving, from a settings datastore, configuration information for remote control settings corresponding to the primary application; and causing, based on the configuration information for the remote control settings, a remote control frame corresponding to the primary application to replace, on a display of the remote control device, a remote control frame corresponding to the previous primary application.

In example 16, the subject matter of example 15 can optionally include wherein the remote control settings comprises remote control settings for a last state of the primary application stored in the settings datastore.

In example 17, the subject matter of examples 15-16 can optionally include storing remote control settings corresponding to a last state of the previous primary application to the settings datastore prior to the previous primary application being switched to become the new background application.

In example 18, the subject matter of examples 15-17 can optionally include wherein each of the plurality of applications comprises configuration information for a plurality of remote control frames, each remote control frame of the plurality of remote control frames corresponding to a different state of an application.

In example 19, the subject matter of examples 15-18 can optionally include wherein the configuration information configures a predefined number of remote control modes for a number of common usages.

In example 20, the subject matter of examples 15-19 can optionally include wherein the configuration information comprises programming language indicating dynamic definitions that establish the remote control frames for each of the plurality of applications.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
  detecting, by a network device, that an application is a background application to become a primary application in focus on a viewing device, the background application being active but not primarily displayed on the viewing device;
  responsive to the detecting the background application to become the primary application, accessing, by the network device from a settings datastore, configuration information for remote control settings corresponding to a previous state of the application, as the primary application previously before becoming the background application, the remote control settings corresponding to the previous state being stored in the settings datastore, the configuration information to configure a remote control frame for display on a remote control device to control one or more functions corresponding to the previous state of the application; and
  responsive to the application becoming the primary application from the background application, causing, by the network device, based on the configuration information for the remote control settings corresponding to the previous state, presentation of the remote control frame corresponding to the previous state of the application on a display of the remote control device, the remote control frame comprising one or more selectable components enabling control of the one or more functions of the previous state of the primary application.

2. The method of claim 1, wherein:
  the detecting comprises detecting a switch command that causes the application to become the primary application and a previous primary application to become a new background application; and
  the causing presentation of the remote control frame comprises replacing a previous remote control frame comprising one or more selectable components enabling control of the previous primary application with the remote control frame comprising the one or more selectable components enabling control of the one or more functions of the previous state of the primary application.

3. The method of claim 2, further comprising:
  storing remote control settings corresponding to a last state of the previous primary application to the settings datastore prior to the previous primary application being switched to become the new background application.

4. The method of claim 1, wherein the configuration information configures a predefined number of remote control modes for a number of common usages.

5. The method of claim 1, wherein the configuration information comprises programming language indicating one or more dynamic definitions that establish the remote control frame for the application.

6. The method of claim 1, further comprising:
  activating and loading a new application, the new application becoming a new primary application;
  causing the primary application to become the background application;
  retrieving configuration information for remote control settings for the new primary application; and
  causing, based on the configuration information for the remote control settings for the new primary application, a remote control frame corresponding to the new primary application to be displayed at the remote control device.

7. A system comprising:
  one or more hardware processors; and
  a storage device storing instructions, that when executed by the one or more hardware processors, cause the one or more hardware processors to perform operations comprising:
  detecting that an application is a background application to become a primary application in focus on a viewing device, the background application being active but not primarily displayed on the viewing device;
  responsive to the detecting the background application to become the primary application, accessing, from a settings datastore, configuration information for remote control settings corresponding to a previous state of the application, as the primary application previously before becoming the background application, the remote control settings corresponding to the previous state being stored in the settings datastore, the configuration information to configure a remote control frame for display on a remote control device control one or more functions corresponding to the previous state of the application; and
  responsive to the application becoming the primary application from the background application, causing, based on the configuration information for the remote control settings corresponding to the previous state, presentation of the remote control frame corresponding to the previous state of the application on a display of the remote control device, the remote control frame comprising one or more selectable components enabling control of the one or more functions of the previous state of the primary application.

8. The system of claim 7, wherein:
the detecting comprises detecting a switch command that causes the application to become the primary application and a previous primary application to become a new background application; and
the causing presentation of the remote control frame comprises replacing a previous remote control frame comprising one or more selectable components enabling control of the previous primary application with the remote control frame comprising the one or more selectable components enabling control of the one or more functions of the previous state of the primary application.

9. The system of claim 8, wherein the operations further comprise:
storing remote control settings corresponding to a last state of the previous primary application to the settings datastore prior to the previous primary application being switched to become the new background application.

10. The system of claim 7, wherein the configuration information configures a predefined number of remote control modes for a number of common usages.

11. The system of claim 7, wherein the configuration information comprises programming language indicating one or more dynamic definitions that establish the remote control frame for the application.

12. The system of claim 7, wherein the operations further comprise further comprise:
activating and loading a new application, the new application becoming a new primary application;
causing the primary application to become the background application;
retrieving configuration information for remote control settings for the new primary application; and
causing, based on the configuration information for the remote control settings for the new primary application, a remote control frame corresponding to the new primary application to be displayed at the remote control device.

13. A hardware storage device storing instructions that when executed by one or more hardware processors of a machine, cause the machine to perform operations comprising:
detecting that an application is a background application to become a primary application in focus on a viewing device, the background application being active but not primarily displayed on the viewing device;
responsive to the detecting the background application to become the primary application, accessing, from a settings datastore, configuration information for remote control settings corresponding to a previous state of the application, as the primary application previously before becoming the background application, the remote control settings corresponding to the previous state being stored in the settings datastore, the configuration information to configure a remote control frame for display on a remote control device to control one or more functions corresponding to the previous state of the application; and
responsive to the application becoming the primary application from the background application, causing, based on the configuration information for the remote control settings corresponding to the previous state, presentation of the remote control frame corresponding to the previous state of the application on a display of the remote control device, the remote control frame comprising one or more selectable components enabling control of the one or more functions of the previous state of the primary application.

14. The hardware storage device of claim 13, wherein:
the detecting comprises detecting a switch command that causes the application to become the primary application and a previous primary application to become a new background application; and
the causing presentation of the remote control frame comprises replacing a previous remote control frame comprising one or more selectable components enabling control of the previous primary application with the remote control frame comprising the one or more selectable components enabling cot of the one or more functions of the previous state of the primary application.

15. The hardware storage device of claim 14, wherein the operations further comprise:
storing remote control settings corresponding to a last state of the previous primary application to the settings datastore prior to the previous primary application being switched to become the new background application.

16. The hardware storage device of claim 13, wherein the configuration information configures a predefined number of remote control modes for a number of common usages.

17. The hardware storage device of claim 13, wherein the configuration information comprises programming language indicating one or more dynamic definitions that establish the remote control frame for the application.

* * * * *

UNITED STATES PATENT AND TRADEMARK OFFICE
CERTIFICATE OF CORRECTION

PATENT NO. : 10,671,261 B2
APPLICATION NO. : 15/407769
DATED : June 2, 2020
INVENTOR(S) : Menand et al.

Page 1 of 1

It is certified that error appears in the above-identified patent and that said Letters Patent is hereby corrected as shown below:

On the Title Page

On page 2, in Column 2, item (56) under "Other Publications", Line 33, delete "16207105,4," and insert --16207105.4,-- therefor In the Claims In Column 20, Line 55, in Claim 7, after "device", insert --to--

In Column 22, Line 32, in Claim 14, delete "cot" and insert --control-- therefor Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*